United States Patent
Yun et al.

(10) Patent No.: US 6,954,322 B2
(45) Date of Patent: Oct. 11, 2005

(54) METHOD AND APPARATUS PROVIDING READ CHANNEL OPTIMIZATION INSURANCE TO AVOID DIVERGENCE IN CHANNEL OPTIMIZATION IN AN ASSEMBLED DISK DRIVE

(75) Inventors: Jong Yun Yun, Cupertino, CA (US); Chin Won Cho, San Jose, CA (US); Hu Yul Bang, Santa Clara, CA (US); Jae June Kim, Sunnyvale, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 188 days.

(21) Appl. No.: 10/376,565

(22) Filed: Feb. 27, 2003

(65) Prior Publication Data

US 2004/0169947 A1 Sep. 2, 2004

(51) Int. Cl.[7] .................................................. G11B 5/09
(52) U.S. Cl. ............................ 360/46; 360/25; 360/31; 360/53; 360/65; 360/66; 360/67; 360/68; 360/69; 714/774; 714/704; 714/746
(58) Field of Search ............................. 360/46, 51, 53, 360/65–69, 25, 31, 54, 55; 714/774, 746, 704, 721, 769

(56) References Cited

U.S. PATENT DOCUMENTS

| | | | | |
|---|---|---|---|---|
| 5,121,260 A | * | 6/1992 | Asakawa et al. | 360/31 |
| 5,954,837 A | * | 9/1999 | Kim | 714/795 |
| 6,078,453 A | * | 6/2000 | Dziallo et al. | 360/55 |
| 6,252,731 B1 | * | 6/2001 | Sloan et al. | 360/31 |
| 6,313,961 B1 | * | 11/2001 | Armstrong et al. | 360/46 |
| 2004/0169953 A1 | * | 9/2004 | Yun et al. | 360/66 |

* cited by examiner

*Primary Examiner*—David Hudspeth
*Assistant Examiner*—Natalia Figueroa
(74) *Attorney, Agent, or Firm*—Gregory Smith & Associates; Jeffrey P. Aiello; Earle Jennings (57) ABSTRACT

The invention provides a method insuring that each read channel optimization step is controllable in terms of quality divergence, that a systematic response can be made which can be readily automated. The method is applicable to a pre-existing read channel optimization (RCO) script. The method includes the following operations. Acquiring a first quality measure and a first parameter list. Performing the pre-existing RCO script creating a second quality measure and a second parameter list based upon the first parameter list. Convergence processing the first and second quality measures and parameter lists.

11 Claims, 7 Drawing Sheets

METHOD AND APPARATUS PROVIDING READ CHANNEL OPTIMIZATION INSURANCE TO AVOID DIVERGENCE IN CHANNEL OPTIMIZATION IN AN ASSEMBLED DISK DRIVE

TECHNICAL FIELD

This invention relates to improvements in the calibration process for an assembled disk drive.

BACKGROUND ART

Assembled disk drives are calibrated after assembly by a process known as read channel optimization. Read channel optimization is a self-test burn-in procedure, which is usually done at the point of manufacture for a disk drive. Typically, read channel optimization is subject to a number of situations which can cause divergence between the optimization steps. The invention provides a straightforward, reliable extension, using existing read channel optimization steps, which insures convergence. Before discussing the details of read channel optimization, a general discussion of disk drive technology is useful.

The Tracks Per Inch (TPI) in disk drives is rapidly increasing, leading to smaller and smaller track positional tolerances. The track position tolerance, or the offset of the read-write head from a track, is monitored by a signal known as the head Positional Error Signal (PES). Reading a track successfully usually requires minimizing read-write head PES occurrences.

Figure 1A:
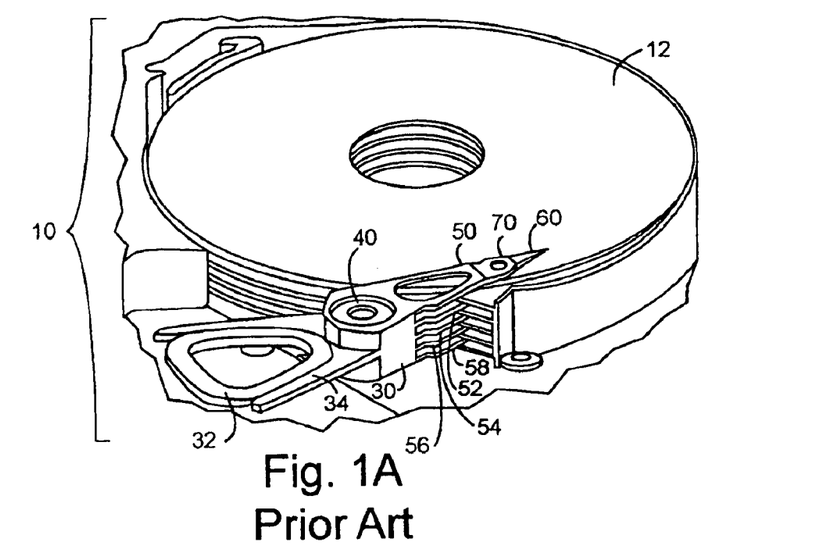
FIG. 1A illustrates a typical prior art high capacity disk drive 10 including actuator arm 30 with voice coil 32, actuator axis 40, actuator arms 50–58 and with head gimbal assembly 60 placed among the disks.

FIG. 1A illustrates a typical prior art high capacity disk drive 10 including actuator arm 30 with voice coil 32, actuator axis 40, actuator arms 50–58 and with head gimbal assembly 60 placed among the disks.

Figure 1B:
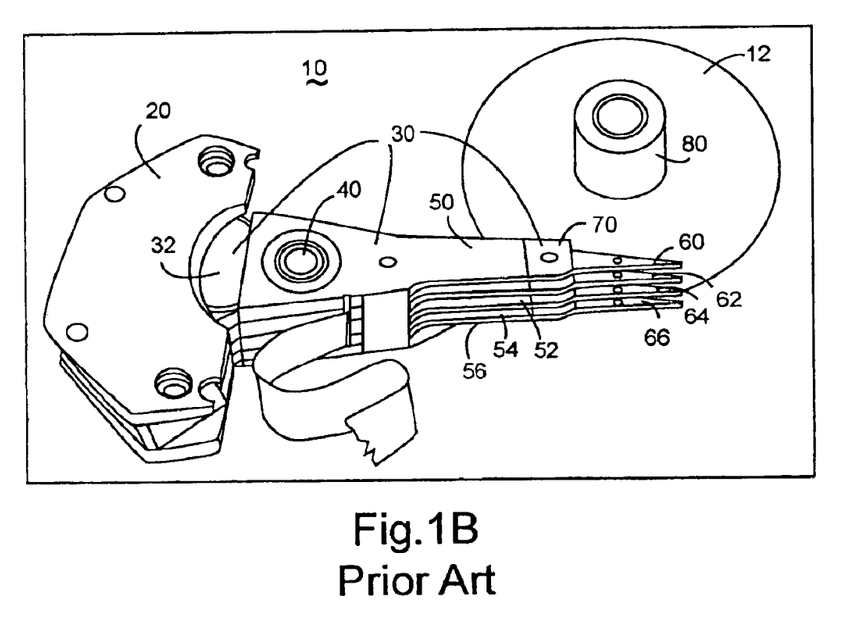
FIG. 1B illustrates a typical prior art, high capacity disk drive 10 with actuator 20 including actuator arm 30 with voice coil 32, actuator axis 40, actuator arms 50–56 and head gimbal assembly 60–66 with the disks removed.

FIG. 1B illustrates a typical prior art, high capacity disk drive 10 with actuator 20 including actuator arm 30 with voice coil 32, actuator axis 40, actuator arms 50–56 and head gimbal assembly 60–66 with the disks removed.

Figure 2A:
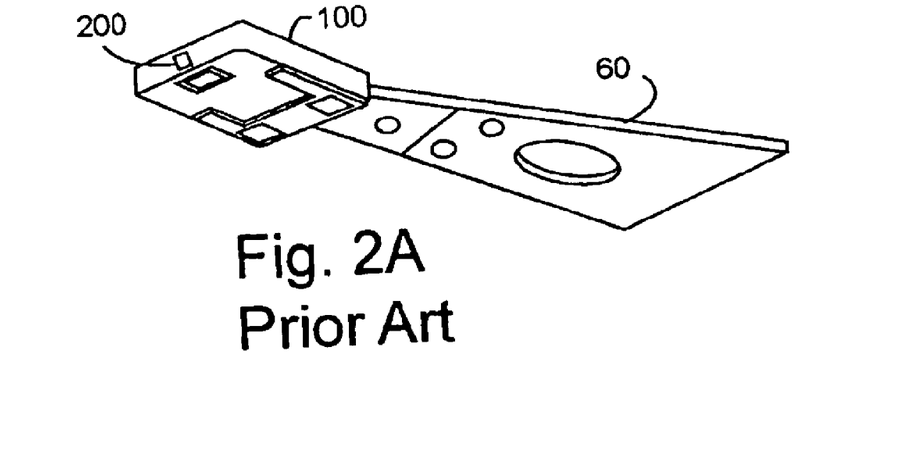
FIG. 2A illustrates a suspended head gimbal assembly 60 containing the MR read-write head 200 of the prior art.

FIG. 2A illustrates a suspended head gimbal assembly 60 containing the MR read-write head 200 of the prior art.

Since the 1980's, high capacity disk drives 10 have used voice coil actuators 20–66 to position their read-write heads over specific tracks. The heads are mounted on head gimbal assemblies 60–66, which float a small distance off the disk drive surface when in operation. The air bearing referred to above is the flotation process. The air bearing is formed by the rotating disk surface 12, as illustrated in FIGS. 1A–1B, and slider head gimbal assembly 60, as illustrated in FIGS. 1A–2A.

Often there is one head per head slider for a given disk drive surface. There are usually multiple heads in a single disk drive, but for economic reasons, usually only one voice coil actuator.

Voice coil actuators are further composed of a fixed magnet actuator 20, interacting with a time varying electromagnetic field induced by voice coil 32, to provide a lever action via actuator axis 40. The lever action acts to move actuator arms 50–56 positioning head gimbal assemblies 60–66 over specific tracks with speed and accuracy. Actuators 30 are often considered to include voice coil 32–34, actuator axis 40, actuator arms 50–56 and head gimbal assemblies 60–66. An actuator 30 may have as few as one actuator arm 50. A single actuator arm 52 may connect 70 with two head gimbal assemblies 62 and 64, each with at least one head slider.

Head gimbal assemblies 60–66 are typically made by rigidly attaching a slider 100 to a head suspension, including a flexure providing electrical interconnection 90 between the read-write head in the slider and the disk controller circuitry. The head suspension is the visible mechanical infrastructure of 60–66 in FIGS. 1A to 2A. Today, head suspension assemblies are made using stainless steal in their suspension and beams. The head suspension is a steel foil placed on a steel frame, coated to prevent rust. It is then coated with photosensitive material. The suspension and flexures are photographically imprinted on the photosensitive material, which is then developed. The developed photo-imprinted material is then subjected to chemical treatment to remove unwanted material, creating the raw suspension and flexure.

Actuator arms 50–56 are typically made of extruded aluminum, which is cut and machined.

Figure 2B:
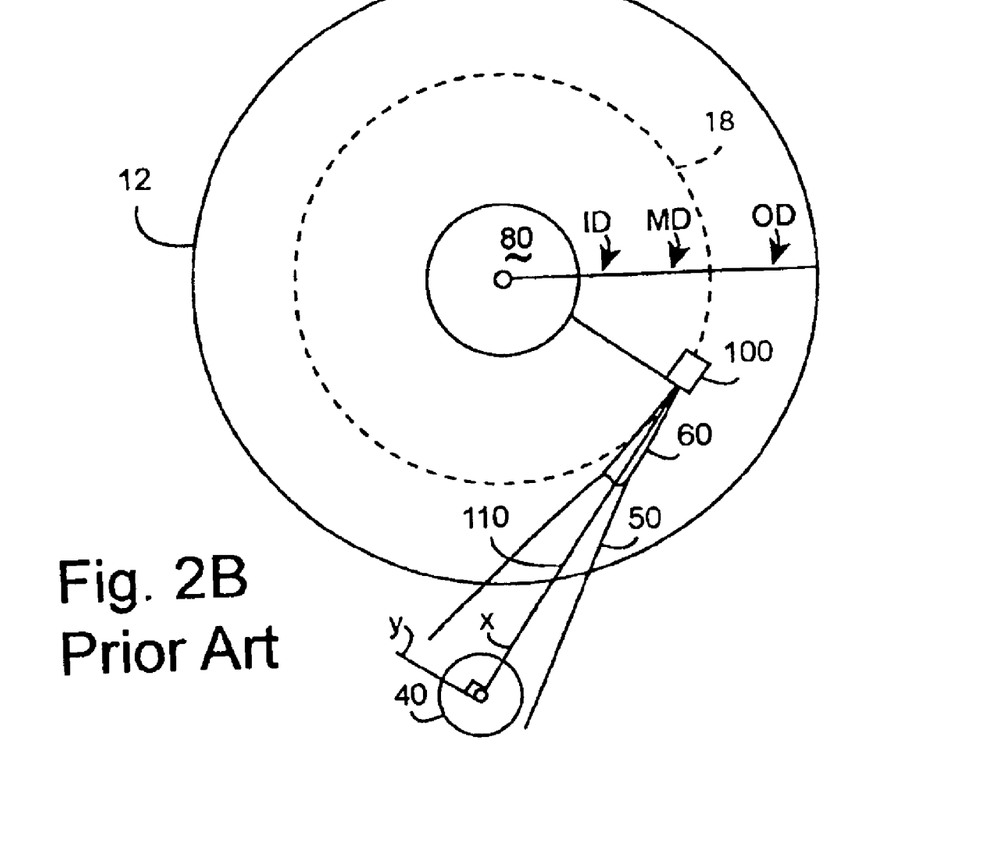
FIG. 2B illustrates the relationship between the principal axis 110 of an actuator arm 50, with respect to a radial vector 112 from the center of rotation of spindle hub 80 as found in the prior art.

FIG. 2B illustrates the relationship between the principal axis 110 of an actuator arm 50, with respect to a radial vector 112 from the center of rotation of spindle hub 80 as found in the prior art.

The actuator arm assembly 50–60–100, pivots about actuator axis 40, changing the angular relationship between the radial vector 112 and the actuator principal axis 110. Typically, an actuator arm assembly 50–60–100 will rotate through various angular relationships. The farthest inside position is often referred to as the Inside Position denoted herein as ID. The position where radial vector 112 approximately makes a right angle with 110 is often referred to as the Middle Position, denoted herein as MD. The farthest out position where the read-write head 100 accesses disk surface 12 is often referred to as the Outside Position, denoted herein as OD.

Note that as illustrated in FIG. 2B, the X axis is preferably situated along the principal axis 110 of the actuator arm. The Y axis preferably intersects the X axis at essentially the actuator pivot 40. When the actuator positions the slider 100 so that the read-write head 200 is at MD, the radial vector 112 is essentially parallel the Y axis. Track 18 is shown near MD, but it should be noted that tracks exist from ID to OD, through out the disk surface 12.

Figure 2C:
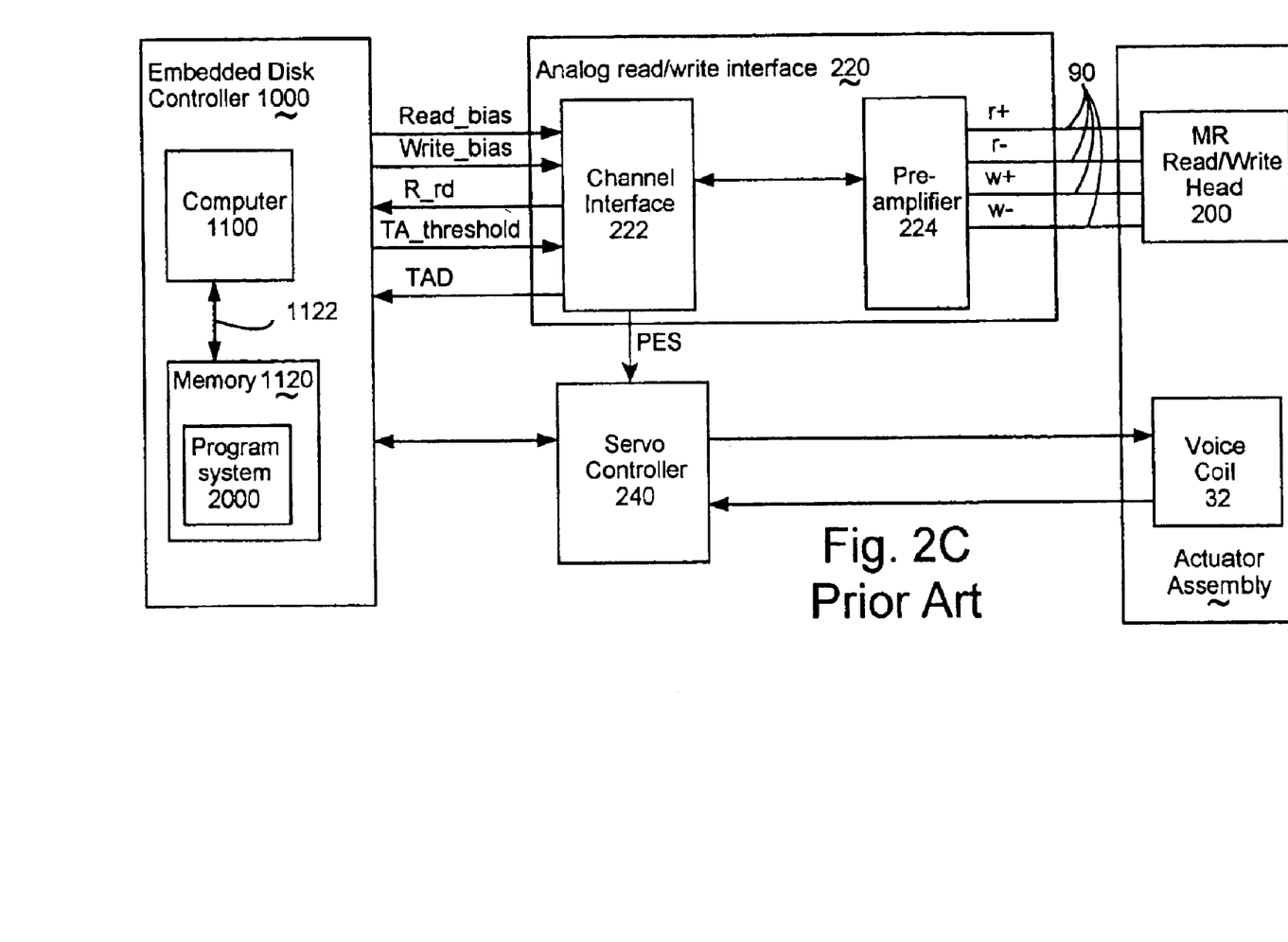
FIG. 2C illustrates a simplified schematic of a disk drive controller 1000 of the prior art, used to control an assembled disk drive 10.

FIG. 2C illustrates a simplified schematic of a disk drive controller 1000 of the prior art, used to control an assembled disk drive 10.

Disk drive controller 1000 controls an analog read-write interface 220 communicating resistivity found in the spin valve within read-write head 200.

Analog read-write interface 220 frequently includes a channel interface 222 communicating with pre-amplifier 224. Channel interface 222 receives commands, from embedded disk controller 100, setting at least the read_bias and write_bias.

Various disk drive analog read-write interfaces 220 may employ either a read current bias or a read voltage bias. By way of example, the resistance of the read head is determined by measuring the voltage drop (V_rd) across the read differential signal pair (r+ and r−) based upon the read bias current setting read_bias, using Ohm's Law. From hereon, the assumption will be that a read current bias is used. This is done to simplify the discussion, and is not meant to limit the scope of the claims.

Typically, channel interface 222 includes amplifying the difference in the read differential signals. The amplified difference is then adjusted to remove asymmetries in voltage swings. The output of the asymmetry adjustment circuit is then presented to a first filter. The first filter is controlled by a first cut-off frequency and also provides boost to further remove high frequency noise. Often, the filtered signal is then demultiplexed into a track servo signal and a data signal. Both the track servo signal and data signal are independently filtered and amplified. There are various points in which the signal enters the digital realm from analog, depending upon the specifics of the channel interface 222.

In FIG. 2C, channel interface 222 also provides a Position Error Signal PES to at least servo controller 240. The PES signal is used by servo controller 240 to control voice coil 32 to keep read-write head 200 close enough to a track 18 of FIG. 2B to support readwrite head 200 communicatively accessing track 18.

Read channel optimization is a self-test burn-in procedure, which is usually done at the point of manufacture for a disk drive. It is usually performed at a single temperature or temperature range, often between about 25° C. to 30° C.

Read channel optimization establishes optimal values for at least the following for each of a collection of track zones:
Write current and write current overshoot controls.
Read bias current.
Read channel gain, used to control amplification of the read channel analog signal.
Read channel filter cut-off frequency Fc.
Asymmetric balancing, so that the positive and negative swings of the read channel signal are balanced.
The filtered read channel signal, a servo track signal and a data channel signal.
FIR taps, typically 10 taps applied to at least one digitized stream, of the raw read channel, the demultiplexed data stream, and/or servo track stream. Typically, the FIR is applied to the digitized raw read channel stream before presenting the stream to a trellis decoder.
Trellis decoder seed values, initializing the track decoding of the filtered digitized stream based upon synchronization with a detected track header.
Servo track threshold values and filter cut-off frequencies.

A track zone is a sequence of neighboring tracks. The collection of track zones encompass all the tracks of a disk surface with each track typically belonging to just one track zone. The disk drive accessing a track within a track zone is based upon the read channel optimized parameters, for that track zone.

Channel Statistical Measurements (CSM) are a standard system used in assembled disk drives to estimate channel quality, by measuring amplitude. Another quality measure is to determine the Bit Error Rate (BER). The track servo signal, various synchronization mark detection measures and error control coding estimates are often used to generate CSM. While BER is considered more accurate, CSM and BER have a strong correlation, making it possible to infer the BER closely from CSM measurements.

CSM is directly related to the channel characteristics, whereas BER is a higher level systems reliability/quality measure. Today, CSM has an advantage in built-in self test situations, in that channel interfaces can often automatically calculate CSM from relatively small test runs, whereas it takes much longer test runs for BER calculations to reach the same level of accuracy.

Consider an example situation where Fc is being tested. After tests of 1000 reads of the same track, one error is reported for Fc of 10 MHz, and two errors are reported for Fc of 12 MHz. The BER estimates are almost identical, because statistically, there is almost no difference in these results. However, for Fc=10 MHz, CSM is 423, and for Fc=12 MHz, CSM is 5023. These CSM figures indicate quickly that Fc=10 MHz is definitely preferred. To reach the same conclusion would take much longer for the BER approach.

In the following figures will be found flowcharts of at least one method of the invention possessing arrows with reference numbers. These arrows will signify flow of control, and sometimes data, supporting implementations, including at least one program step or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to, an instruction processor. The instruction processor includes at least one instruction processing element and at least one data processing element, each data processing element controlled by at least one instruction processing element.

Figure 3A:
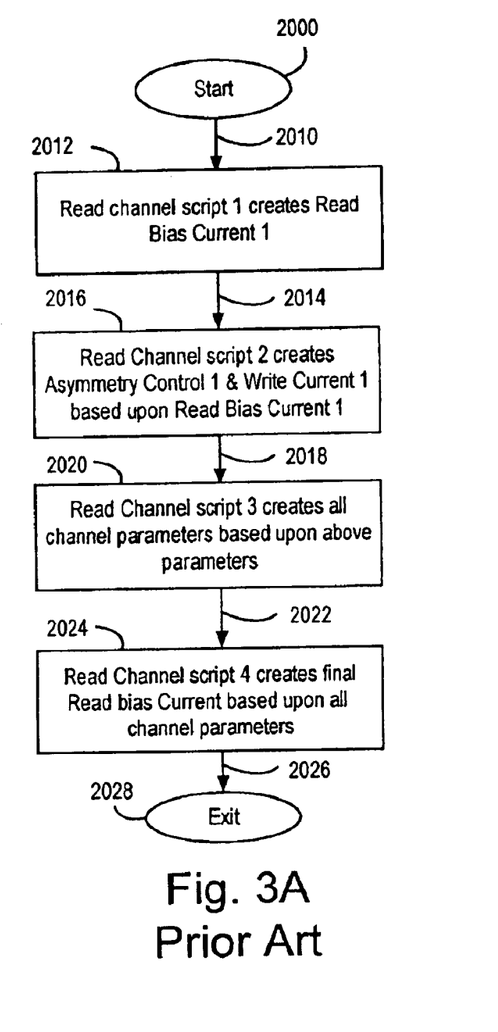
FIG. 3A is a detail flowchart of program system 2000 illustrating a simplified, typical read channel optimization process as found in the prior art.

FIG. 3A is a detail flowchart of program system 2000 comprising program steps residing in a memory 1120 accessibly coupled 1122 to the computer 1100 controlling the disk drive 10 illustrating a simplified, typical read channel optimization process as found in the prior art.

Operation 204 performs read channel script one, creating a read bias current 1. Operation 208 performs read channel script two, creating an asymmetry control 1 and write current 1, based upon read bias current 1. Operation 2012 performs read channel script 3, creating all channel parameters based upon the above parameters of read bias current 1, asymmetry control 1, and write current 1. Operation 2016 performs read channel script 4, creating the read bias current based upon all the channel parameters.

Figure 3B:
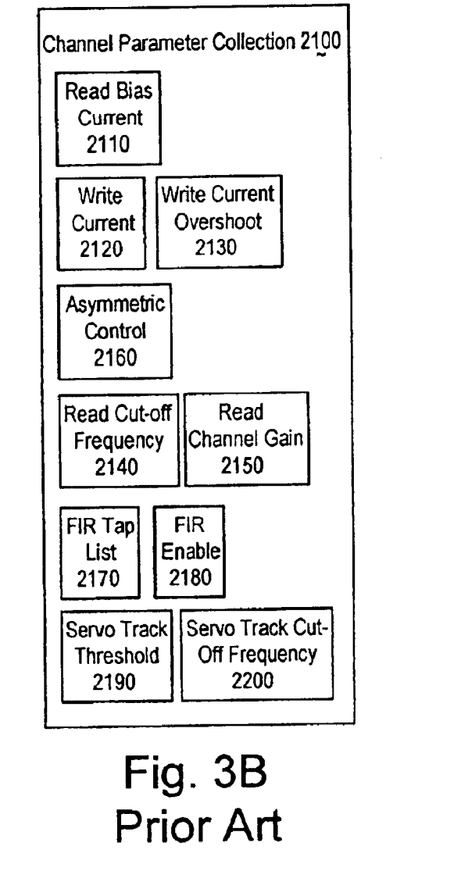
FIG. 3B illustrate the read channel parameter collection 2100, which may reside in the accessibly coupled memory 1120 of FIG. 2C.

FIG. 3B illustrate the read channel parameter collection 2100, which may reside in the accessibly coupled memory 1120 of FIG. 2C.

The read channel parameter collection 2100 often includes the following: read bias current 2110, write current 2120, write current overshoot control 2130, read channel cutoff frequency 2140, read channel amplification gain 2150, asymmetric balancing control 2160, FIR tap list 2170, FIR enable 2180, servo track threshold value 2190, and servo track filter cut-off frequency 2200.

The general objective in a read channel optimization process, such as illustrated in FIG. 3B, is that quality grows with each step of the process. The quality is typically associated with a quality measure such as CSM or BER decreasing.

However, there is a persistent problem with existing channel optimizations processes. Such processes often include diverging steps, in which a quality measure such as CSM or BER grows in value after applying a process step. Today, the inventors know of no systematic method addressing such divergences. As used herein, a read channel optimization step diverges if the quality does not increase. A read channel optimization step converges if the quality increases.

What is needed is a method insuring that each read channel optimization step is controllable in terms of this quality divergence, that a systematic response can be made which can be readily automated.

SUMMARY OF THE INVENTION

Aspects of the invention address the problems discussed in the background.

The invention provides a method insuring that each read channel optimization step is controllable in terms of this quality divergence, that a systematic response can be made which can be readily automated.

The method is applicable to a pre-existing read channel optimization (RCO) script. The method includes the following operations. Acquiring a first quality measure and a first parameter list. Performing the pre-existing RCO script creating a second quality measure and a second parameter list based upon the first parameter list. Convergence processing the first and second quality measures and parameter lists.

Convergence processing includes the following. Determining if the first quality measure is greater than the second quality measure. If yes, determining if the second quality measure is greater than an acceptable threshold. If yes, performing the pre-existing RCO script based upon the second parameter list.

Convergence processing may further include performing the pre-existing RCO script based upon the first parameter list again, if the first quality measure is not greater than the second quality measure.

Note that in certain preferred embodiments, a new read channel optimization process uses this method upon at least one of the pre-existing read channel optimization scripts. It may further be preferred that there be an ability to enable or disable use of the method on a pre-existing read channel optimization script.

The invention includes apparatus implementing the method, including the program system 2000, embedded controller system 1000 and/or disk drive 10 incorporating the method applied to at least one pre-existing read channel optimization script.

Note that in certain embodiments of the invention, the tests of quality measures may be in terms of greater than or equal, rather than only greater than, as stated herein. The discussion and claims herein are written in terms of greater than, and will be interpreted herein as referring to both forms of tests.

In certain preferred embodiments, the quality measure includes CSM, BER, or functions of CSM and/or BER. It is typically preferred that quality increases as these quality measures decrease, such as is the case for CSM and BER. However, the invention includes the use of quality measures in which quality increases as those quality measures increase. An example of such a quality measure is the negative of CSM, where as –CSM gets more negative, and thus smaller, the quality decreases.

These and other advantages of the present invention will become apparent upon reading the following detailed descriptions and studying the various figures of the drawings.

DETAILED DESCRIPTION OF THE INVENTION

In one aspect, the invention provides a method insuring that each read channel optimization step is controllable in terms of this quality divergence, that a systematic response can be made which can be readily automated.

The method is applicable to a pre-existing read channel optimization (RCO) script. The method includes the following operations. Acquiring a first quality measure and a first parameter list. Performing the pre-existing RCO script creating a second quality measure and a second parameter list based upon the first parameter list. Convergence processing the first and second quality measures and parameter lists.

Convergence processing includes the following. Determining if the first quality measure is greater than the second quality measure. If yes, determining if the second quality measure is greater than an acceptable threshold. If yes, performing the pre-existing RCO script based upon the second parameter list.

Convergence processing may further include performing the pre-existing RCO script based upon the first parameter list again, if the first quality measure is not greater than the second quality measure.

Note that in certain preferred embodiments, a new read channel optimization process uses this method upon the pre-existing read channel optimization scripts. It may further be preferred that there be an ability to enable or disable use of the method on a pre-existing read channel optimization script.

The invention includes various apparatus implementing the method, including the program system 2000, embedded controller system 1000 and/or disk drive 10 incorporating the method applied to at least one pre-existing read channel optimization script.

Note that in certain embodiments of the invention, the tests of quality measures may be in terms of greater than or equal, rather than only greater than, as stated herein. The discussion and claims herein are written in terms of greater than, and will be interpreted herein as referring to both forms of tests.

In certain preferred embodiments, the quality measure includes CSM, BER, or functions of CSM and/or BER. It is typically preferred that quality increases as these quality measures decrease, such as is the case for CSM and BER. However, the invention includes the use of quality measures in which quality increases as those quality measures increase. An example of such a quality measure is the negative of CSM, where as -CSM gets more negative, and thus smaller, the quality decreases.

Figure 4:
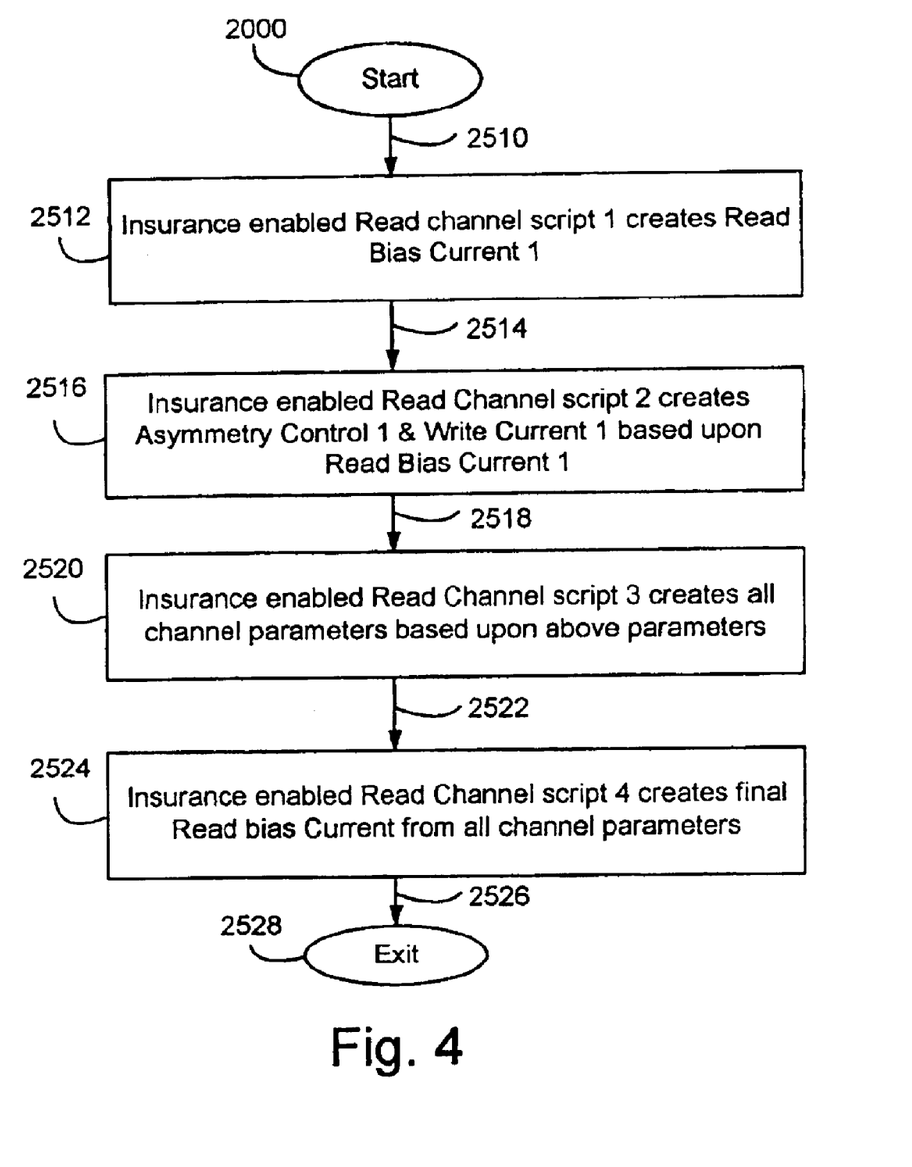
FIG. 4 is a detail flowchart of operation 2000 of FIGS. 2C and 3A preferably implementing an enabling scheme to trigger the invention's method.

FIG. 4 is a detail flowchart of operation 2000 of FIGS. 2C and 3A preferably implementing an enabling scheme to trigger the invention's method.

Operation 2506 performs insurance enabled read channel script one, creating read bias current one.

Operation 2510 performs insurance enabled read channel script two, creating asymmetry control 1 and write current 1, based upon read bias current 1.

Operation 2514 performs insurance enabled read channel script three, creating all channel parameters based upon the above parameters of read bias current 1, asymmetry control 1 and write current 1.

Operation 2518 performs insurance enabled read channel script four, creating final read bias current from all the channel parameters.

Figure 5:
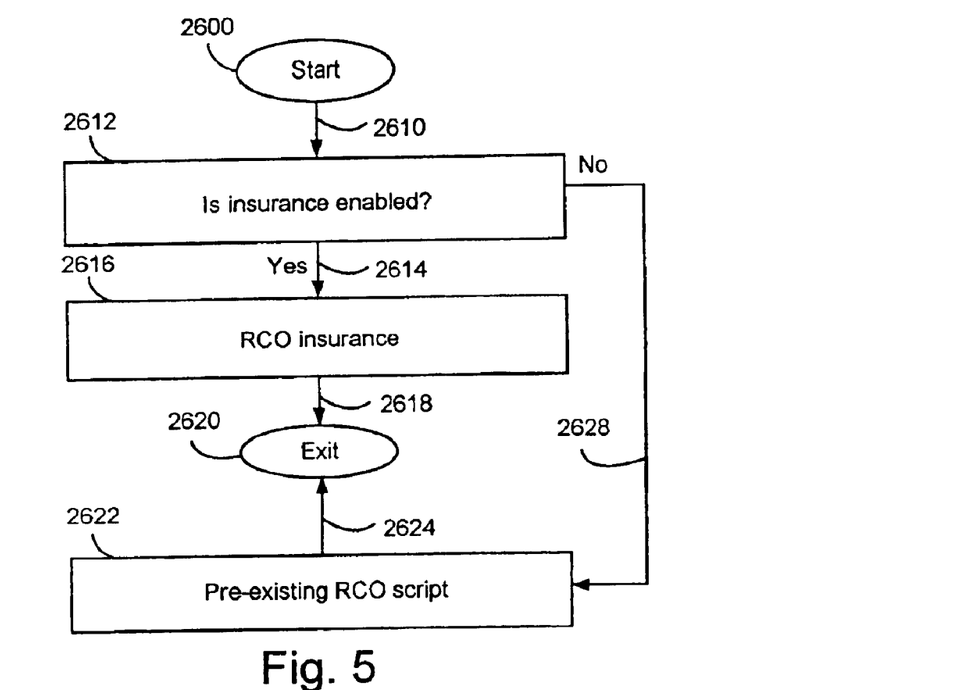
FIG. 5 is a detail flowchart of at least one of the operations of FIG. 4 illustrating the insurance enabling mechanism.

FIG. 5 is a detail flowchart of at least one of the operations of FIG. 4 illustrating the insurance enabling mechanism.

Arrow 2610 directs the flow of execution from starting operation 2600 to operation 2612. Operation 2612 determines if the insurance method is enabled. Arrow 2614 directs execution from operation 2612 to operation 2616 when the determination is >Yes=. Arrow 2628 directs execution to 2622 when the determination is >No=. Arrows 2618 and 2624 signify flow of control and sometimes data. Reference 2620 refers to the operation of termination in the flowchart.

Operation 2616 performs the method insuring that the pre-existing read channel optimization script is controllable in terms of quality divergence.

Operation 2622 performs the pre-existing read channel optimization script.

Figure 6A:
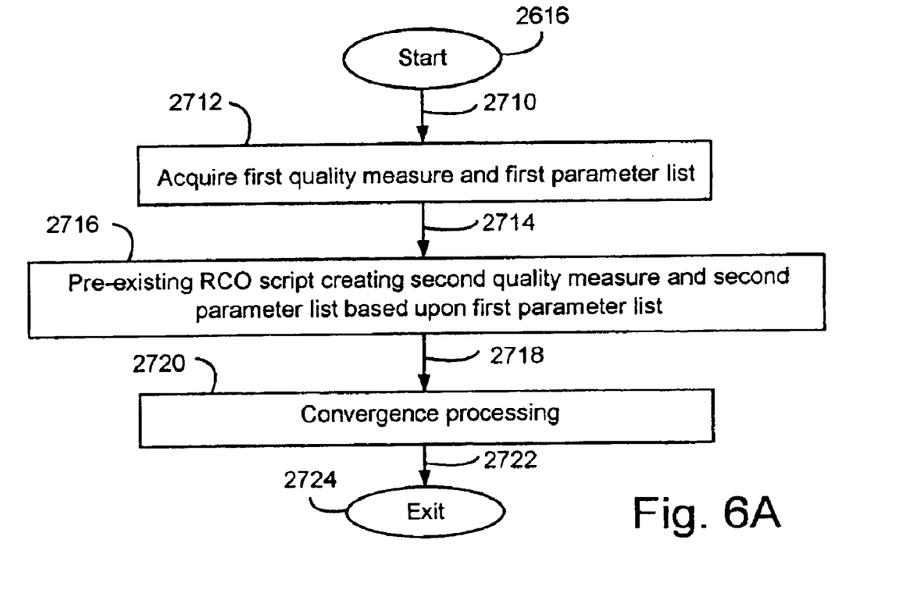
FIG. 6A is a detail flowchart of operation 2616 of FIG. 5 illustrating the method insuring that a pre-existing read channel optimization script is controllable in terms of quality divergence.

FIG. 6A is a detail flowchart of operation 2616 of FIG. 5 illustrating the method insuring that a pre-existing read channel optimization script is controllable in terms of quality divergence.

Operation 2712 performs acquiring a first quality measure and a first parameter list.

Operation 2716 performs the pre-existing read channel optimization script creating a second quality measure and a second parameter list based upon the first parameter list.

Operation 2720 performs convergence processing the first quality measure and the second quality measure and the first parameter list and the second parameter list.

In FIG. 6A, arrows 2710, 2714, 2718, and 2722 signify flow of control and sometimes data, Reference 2724 refers to the operation of termination in the flowchart.

Figure 6B:
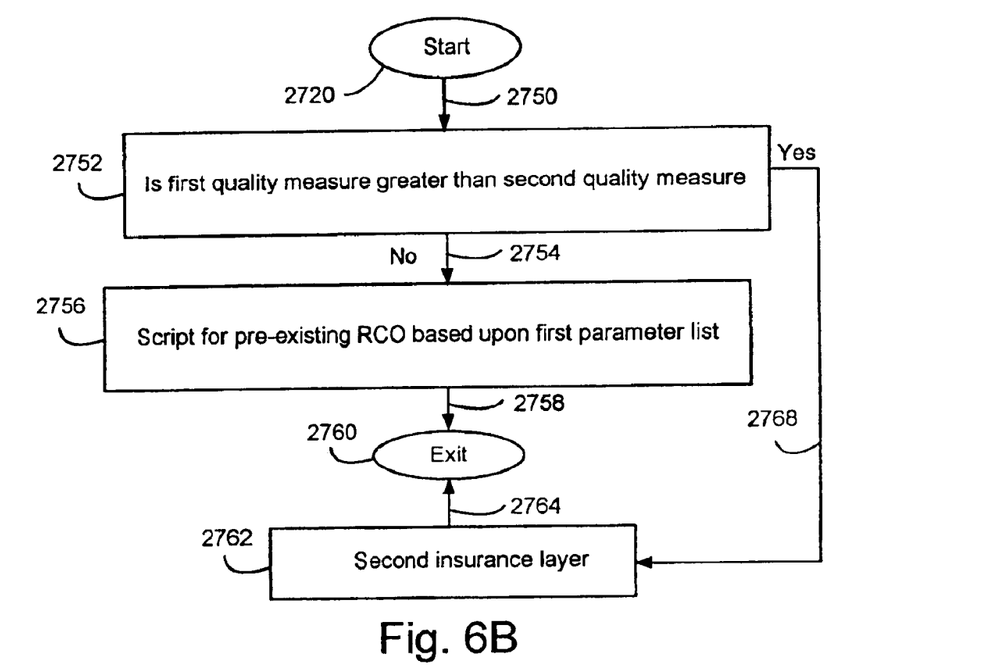
FIG. 6B is a detail flowchart of operation 2720 of FIG. 6A illustrating convergence processing.

Operation 2752 determines if the first quality measure is greater than the second quality measure. Arrow 2754 directs execution from operation 2752 to operation 2756 when the determination is >No=. Arrow 2768 directs execution to 2762 when the determination is >Yes=.

Operation 2756 performs script for pre-existing read channel optimization based upon the first parameter list.

Operation 2762 performs a second layer of insurance.

In FIG. 6B, arrows 2750 and 2758 signify flow of control and sometimes data. Reference 2762 refers to the operation of termination in the flowchart.

Figure 7:
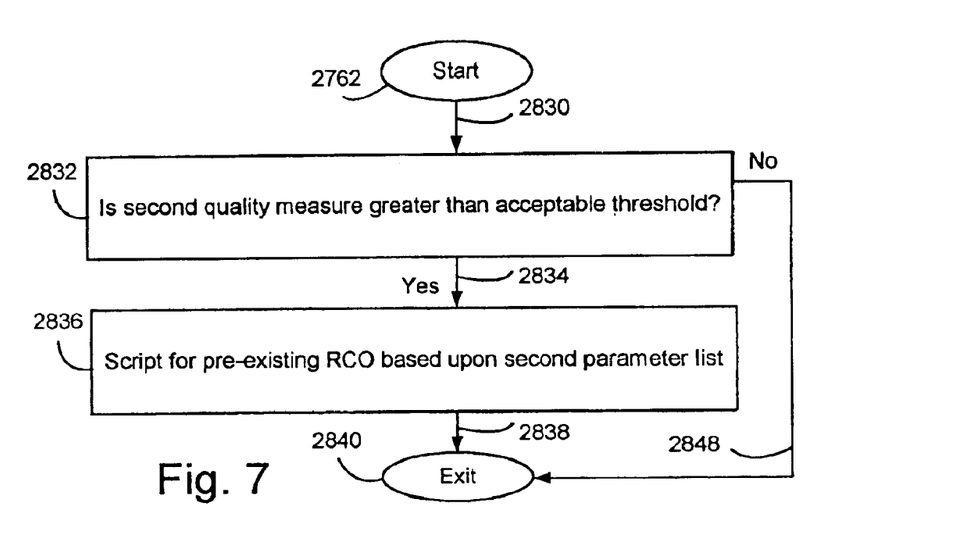
FIG. 7 is a detail flowchart of operation 2762 of FIG. 6B illustrating the second layer of insurance.

FIG. 7 is a detail flowchart of operation 2762 of FIG. 6B illustrating the second layer of insurance.

Operation 2832 determines if the second quality measure is greater than an acceptable level. Arrow 2834 directs execution from operation 2832 to operation 2836 when the determination is >Yes=.

Operation 2836 performs script for pre-existing read channel optimization based upon the second parameter list.

In FIG. 7, arrows 2830, 2838, and 2848 signify flow of control and sometimes data. Reference 2840 refers to the operation of termination in the flowchart.

The preceding embodiments have been provided by way of example and are not meant to constrain the scope of the following claims.

What is claimed is:

1. A method insuring that a pre-existing read channel optimization script is controllable in terms of quality divergence, comprising the steps of:

acquiring a first quality measure and a first parameter list;

performing said pre-existing read channel optimization script creating a second quality measure and a second parameter list based upon said first parameter list; and convergence processing said first quality measure and said second quality measure and said first parameter list and said second parameter list;

wherein the step convergence processing is further comprised of the steps of:

determining if said first quality measure is greater than said second quality measure;

determining if said second quality measure is greater than an acceptable threshold;

performing said pre-existing read channel optimization script based upon said second parameter list, whenever said first quality measure is greater than said second quality measure and said second quality measure is greater than an acceptable threshold.

2. The method of claim 1, wherein the step convergence processing is further comprised of the step of:

performing said pre-existing read channel optimization script based upon said first parameter list, whenever said first quality measure is not greater than said second quality measure.

3. The method of claim 1, wherein said read channel optimization script belongs to a read channel optimization script collection including at least read channel optimization script one, read channel optimization script two, read channel optimization script three and read channel optimization script four.

4. A read channel optimization process, including at least one new script implement the method of claim 1 applied to said re-existing read channel optimization script.

5. The method of claim 4, wherein said new script further includes an enabling mechanism supporting one of the collection comprising the steps of performing said pre-existing read channel optimization script and applying said insuring method to using said pre-existing read channel optimization script.

6. A program system implementing the method of claim 4 comprising program steps implementing each of said steps of claim 4, residing in a memory accessibly coupled to a computer controlling a disk drive; wherein said disk drive includes said memory and said computer.

7. A disk drive controlled by a program system implementing the method of claim 4 comprising program steps implementing each of said steps of claim 4, residing in a memory accessibly coupled to a computer controlling said disk drive; wherein said disk drive includes said memory and said computer.

8. A program system implementing the method of claim 1 comprising program steps implementing each of said steps of claim 1, residing in a memory accessibly coupled to a computer controlling a disk drive; wherein said disk drive includes said memory and said computer.

9. A disk drive controlled by a program system implementing the method of claim 1 comprising program steps implementing each of said steps of claim 1, residing in a memory accessibly coupled to a computer controlling said disk drive; wherein said disk drive includes said memory and said computer.

10. A manufacturing method for a disk drive, implementing the method of claim 1 as a self-test burn-in procedure for said disk drive.

11. Said disk drive, as a product of the process of claim 10.

* * * * *